Aug. 1, 1967  S. SILVERMAN  3,333,882

LIFTING AND HOLDING DEVICE

Filed Feb. 23, 1965

INVENTOR.
Samuel Silverman
BY Harold E. Cole
Attorney

3,333,882
LIFTING AND HOLDING DEVICE
Samuel Silverman, Malden, Mass.
(85 Washington St., Somerville, Mass. 02143)
Filed Feb. 23, 1965, Ser. No. 434,387
2 Claims. (Cl. 294—33)

This invention relates to a lifting and holding device.

One object of my invention is to provide such a device that will, by squeezing a handle and compression member by one's hand, bring attaching members into contact with a pan or other receptacle and thereby grip the latter so that lifting my device also lifts the receptacle without locking or otherwise fastening my device to said pan.

Another object is to so form said compression member that it will, with a minimum of effort, readily move towards said handle when the two are grasped together to thereby draw attaching members inwardly and into engagement with said pan.

A further object is to so form said attaching members that they will freely move inwardly towards each other by movement of said compression member, and yet be wide enough to hold a said pan or receptacle well balanced without a tendency to tilt.

A still further object is to provide such a device that is relatively inexpensive to produce and simple to use.

The foregoing and other objects which will appear as the nature of the invention is better understood, may be accomplished by a construction, combination and arrangement such as disclosed by the drawing. The nature of the invention is such as to render it susceptible to various changes and modifications, and, therefore, I am not to be limited to the construction disclosed by the drawing, nor to the particular parts described in the specification; but am entitled to all such changes therefrom as fall within the scope of my claims.

Figure 1:
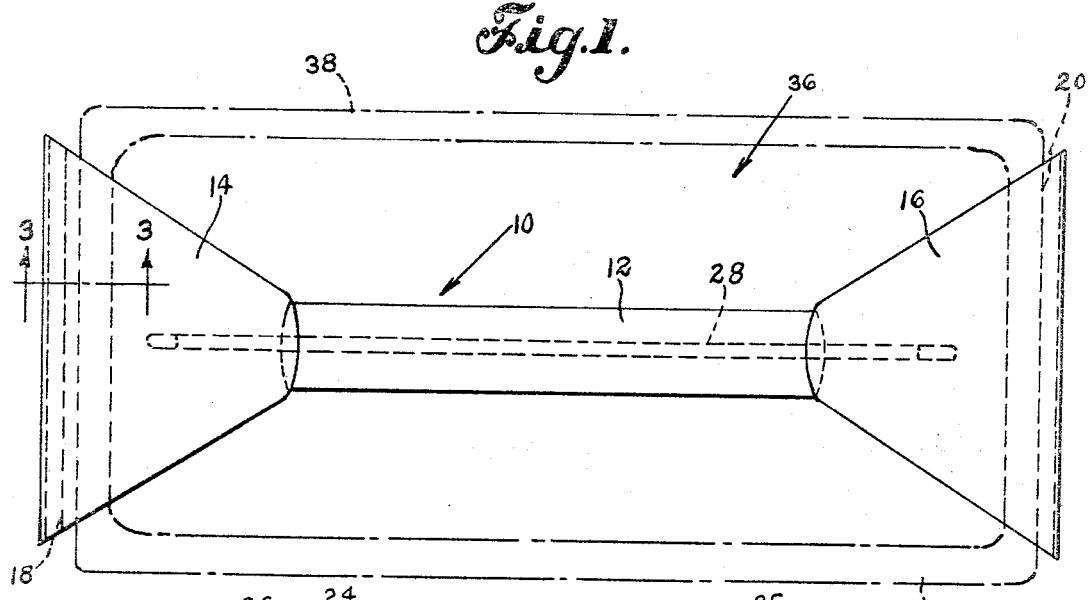
FIG. 1 is a top plan view showing my lifting and holding device in association with a pan preliminary to the lifting and holding of the latter.

As illustrated, my lifting and holding device 10 has a handle 12 that is relatively rigid. At opposite sides of the end extremities of the latter are left and right attaching members or wings 14 and 16 respectively that extend diagonally downward and outwardly and also flare outwardly and downwardly. Each said attaching member has an engaging or gripping extension member 18 and 20 respectively extending diagonally downward and inward and forming an acute angle with respect to the portion of said wing or attaching member adjoining it.

Said attaching members 14 and 16 are somewhat resilient and may be made of flat metal. They are made integral with said handle 12 at their upper ends, as by welding as at 24 and 25, and in the upper half portion they are preferably slightly concaved at their outer surface as at 26 and 27. By making them relatively wide at the bottom, they serve to keep a receptacle well balanced and thus keep a pan 30, later described, from tilting when in lifted position.

A compression member 28 is directly below and spaced from said handle 12 and is fixedly attached to said attaching members 14 and 16 at the lower half portions thereof as at 30 and 32 as by welding. This compression member 28 is arched or has an intermediate rise therein between opposite ends as shown in said FIG. 2. It is quite flexible as compared to said handle 12 thus enabling it to more freely bend or move towards said handle 12 when lifting a receptacle such as said food-holding pan 36.

In use, my holder is especially adaptable for lifting said hot pan 36 usually with food in it, from a steam table. This pan has an outwardly extending flange 38 from which an angular extension 40 extends downwardly.

Figure 2:
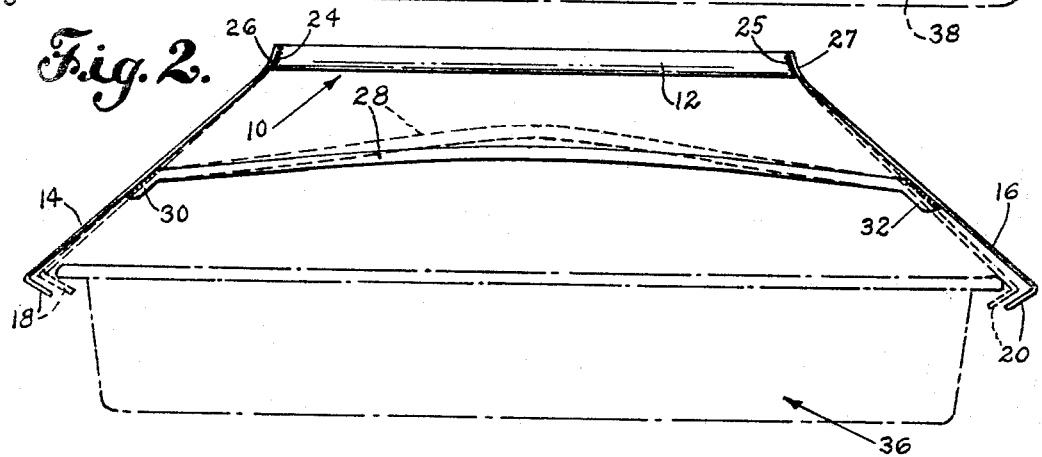
FIG. 2 is a side elevational view of said device and pan similar to FIG. 1, the dash lines showing the compression member and attaching members contacting said pan and in lifting and holding position.
Figure 3:
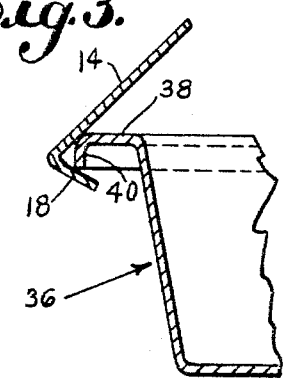
FIG. 3 is an enlarged, sectional view taken on the line 3—3 of FIG. 1; but showing an attaching member engaging said pan ready to lift the latter.

In normal position my holder extends outwardly beyond the receptacle 36 to be lifted as indicated by the full lines in said FIG. 2. Said compression member 28 as well as said handle 12 are grasped by a person's fingers and hand. This draws said compression member upwardly, and moves said attaching members 14 and 16 towards each other, thus bringing said engaging members 18 and 20 under and in contact with said receptacle end extensions 40 as illustrated by the dash lines in said FIG. 2. The weight of said receptacle 36, in addition to the compression by the person's fingers of said compression members 28, tightly holds said engaging members 18 and 20 under and in contact with said receptacle extensions 40.

What I claim is:

1. A lifting and holding device comprising two resilient attaching members at opposite sides having engaging members at lower ends thereof, said attaching members extending diagonally downward and outward and flaring outwardly between the top and bottom thereof, a handle between and attached to said attaching members at the upper ends of the latter, and a unitary length of material forming a compression member spaced from and below said handle and attached to said attaching members at lower half portions thereof and extending between them having an intermediate rise therein.

2. A lifting and holding device as set forth in claim 1, said attaching members being formed of flat material and having a concave portion in their upper half portions.

References Cited

UNITED STATES PATENTS

| | | | |
|---|---|---|---|
| 621,199 | 3/1899 | Altenbaugh | 294—106 |
| 1,618,568 | 2/1927 | Carlson | 294—106 |
| 1,687,552 | 10/1928 | Fassbender | 294—16 |
| 1,779,291 | 10/1930 | Richardson | 294—99 |
| 2,157,753 | 5/1939 | Gantt | 294—99 |
| 2,561,807 | 7/1951 | Malavazos | 294—33 |

HUGO O. SCHULZ, *Primary Examiner.*